United States Patent [19]

Leppek

[11] Patent Number: 5,787,177
[45] Date of Patent: Jul. 28, 1998

[54] INTEGRATED NETWORK SECURITY ACCESS CONTROL SYSTEM

[75] Inventor: James Leppek, Melbourne, Fla.

[73] Assignee: Harris Corporation, Melbourne, Fla.

[21] Appl. No.: 690,784

[22] Filed: Aug. 1, 1996

[51] Int. Cl.$^6$ .................. H04L 9/00; H04L 9/32
[52] U.S. Cl. .................. 380/25; 380/4; 380/23; 380/49; 380/50
[58] Field of Search .................. 380/4, 23, 24, 380/25, 49, 50, 59

[56] References Cited

U.S. PATENT DOCUMENTS 4,961,224  10/1990  Yung ................................. 380/25
5,204,961  4/1993  Barlow ............................. 380/4 X Primary Examiner—Bernarr E. Gregory
Attorney, Agent, or Firm—Charles E. Wands

[57] ABSTRACT

A network resource security services control system comprises an integrated arrangement of security services, that are operative to control the ability of an information storage and retrieval network user to have access to and communicate with one or more information resources within the network. The security access control mechanism monitors activity associated with a user's attempt to and actual conducting of data communications with respect to a system resource, and controllably modifies one or more security relationships of a security association that has been established among the users and resources of the system, in dependence upon one or more characteristics of the monitored activity, in such a manner that affects the ability of the system user to conduct data communications with respect to a system resource.

8 Claims, 2 Drawing Sheets

INTEGRATED NETWORK SECURITY ACCESS CONTROL SYSTEM

FIELD OF THE INVENTION

The present invention relates in general to data processing and communication systems, and is particularly directed to a data communication security access control mechanism, that is comprised of an integrated arrangement of security services, that are operative to control the ability of an information storage and retrieval network user to have access to and communicate with one or more information resources within the network. The security access control mechanism of the invention includes monitoring activity associated with a user's attempt to and actual conducting of data communications with respect to a system resource, and also the controllable modification of one or more security relationships of a security association that has been established among the users and resources of the system, in dependence upon one or more characteristics of the monitored activity, in such a manner that affects the ability of the system user to conduct data communications with respect to a system resource.

BACKGROUND OF THE INVENTION

The rapid expansion of the data communications industry, in particular the Internet and the World Wide Web (WWW), sometimes referred to as the superinformation highway, has provided data processing system users with what is effectively a global communication network interconnecting a vast number of databases and other network users. The local link between the network and the user is typically by way of a phone line (e.g., analog or ISDN, for example) of a public communication service provider, with the workstation hardware including a modem or terminal adapter equipment that allows dial-up access between the user and a remote party. Since a user's workstation is coupled directly to such interface equipment, any network user ostensibly has the ability to access any information resource coupled to a network node.

As a reduced complexity, non-limiting example, FIG. 1 diagrammatically illustrates a network user workstation 10 which is coupled via a communication link 11 to a local area network (LAN) 20 by way of a LAN interface 13. LAN interface 13 also provides access to an external network, such as a public communication services (PCS) network, including the Internet 30, that provides potential access to any network information resource (e.g., processor-accessible digital database). The local area network 20 to which user 10 is connected customarily includes one or more computer-based units, such as the illustrated workstations 21 and 22, network server 23 and printer 24, which are interconnected via a hub 25. The hub 25 is connected to the LAN interface 13, so that the end user workstation 10 may access any 'local' information resource of the LAN 20. In order to connect to the external network 30, the network interface 13 may be coupled through an electronic mail gateway 32 and a modem 33, whereby a dial-up connection may be provided to an Internet connection or other global resource provider 34, through which access to any node in the overall network is achieved.

Because the network provides a potential window into any information resource linked to any of its nodes, it is customary to both wrap or embed all communications in a 'security blanket' (some form of encryption) at a communication sourcing end, and to employ one or more permission (authorization and authentication) layers that must be used to gain access to another system resource (e.g., another computer). Once installed, such schemes operate as micro security systems, primarily as binary permission filters—the user is either permitted or denied access to a destination information resource, and are customarily limited to a relatively limited (and often fixed) set of access permission criteria. Now, while such schemes provide some measure of access control, they do not provide a macro perspective or control of all of the resources for which a given network security system may be configured.

SUMMARY OF THE INVENTION

In accordance with the present invention, this problem is effectively remedied by a new and improved network resource security access control mechanism that includes protection control, access control, event management and a pro-active security agent routines integrated within the communications control software resident in a data communications network control processor, for controlling the ability of a network user to have access to and communicate with one or more information resources of the network.

The protection control routine comprises cryptography algorithms and authentication mechanisms for protecting data transported over the network. The access control routine is used in conjunction with the protection control routine and includes right to access control factors, such as time of day, length of session, etc., components, with which a user's request for access and continued activity are compared to derive inputs to the event manager. The event manager is a principal control routine that is operative to monitors activity among users and resources of the network. As it monitors these events, the event manager may take action that will controllably intervene in the current network activity for a user of interest, in response to one or more relationships associated with such activity being satisfied.

For this purpose, each network resource object has a security association with respect to every other resource object in the network, that defines the ability and permission of a respective resource object to communicate with and gain access to that other resource object. These security associations may include one or more of the users' authorization and authentication codes, lists of other objects with whom the users may or may not communicate, access time limitations, what cryptography mechanisms may be or must be used, etc. As will be described, controlled intervention by the event manager includes the ability to affect or modify this security association and thereby a user's ability to gain access to or continue to be granted access to another resource object in the network.

The event manager may employ a separate set of policy rules that are not known to the user and serve as an additional layer of access control for enhancing the security of the network. Such policy rules are established external to the network and may include a prescribed activity intensity level associated with the number of or total length of time a resource object may communicate with another resource. In the event a policy rule is violated, the event manager may take relatively limited action, such as sourcing a query to the user to provide further authentication or other information, such as a request to the protection control routine to employ an increased level of cryptography complexity associated with a higher network usage level. On the other hand, if the security rule set employed by the event manager classifies excessive user activity as a substantial network security 'threat', it may call up the pro-active security agent routine, so as to impair the user's ability to use the network. The security rules themselves, as objects of the overall security access control system, may be modified or updated, as required to accommodate event changes, without necessarily terminating access to the network.

The pro-active security agent routine is a data communications impairment routine, which may be selectively called up by the event manager to perform one or more data communication interference exercises with respect to a data path or user data resource object of interest. As will be described, this routine is invoked in extreme cases where the event manager has determined that a user's further use of the network would constitute a substantial security threat.

DETAILED DESCRIPTION

Figure 1:
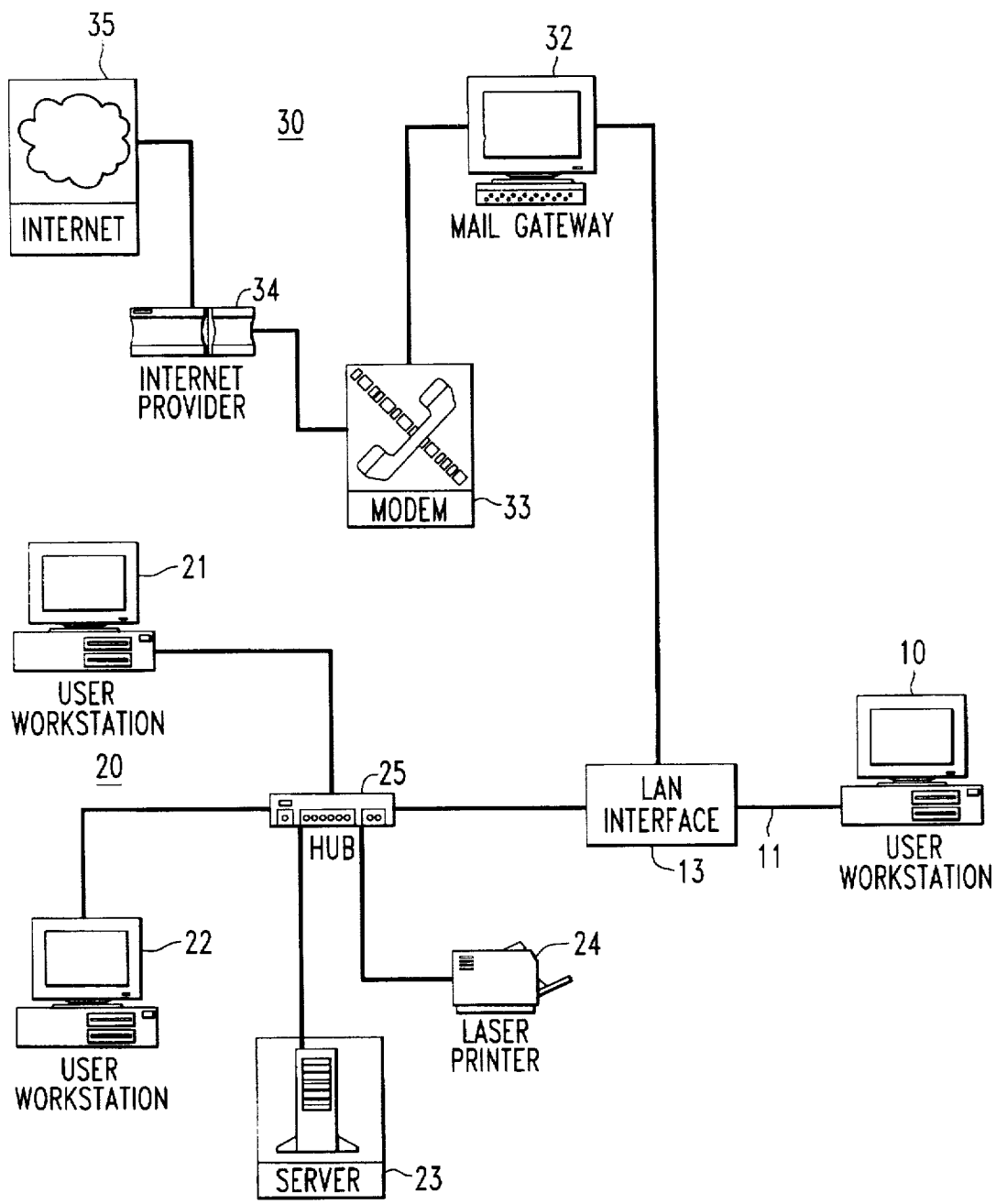
FIG. 1 diagrammatically illustrates a user workstation coupled to a local area network by way of a local area network interface, which also provides access to an external network.

Before describing in detail the new and improved network resource security access control mechanism in accordance with the present invention, it should be observed that the present invention resides primarily in what is effectively a new and improved data security access control mechanism implemented as an arrangement of abstract security services. These abstract security services include protection control, access control, event management and a pro-active security agent that are integrated within the communications control software resident in a data communications network control processor, for controlling the ability of a network user to have access to and communicate with one or more information resources of the network. The particular resources and the information they provide, per se, are not considered part of the invention.

Consequently, the manner in which the present invention communicates with and controls a user's access to such information resources have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood. For a non-limiting example of an implementation of the present invention using industry-standard software coding, attention may be directed to the detailed software listings and attendant annotations in the attached Appendix.

Figure 2:
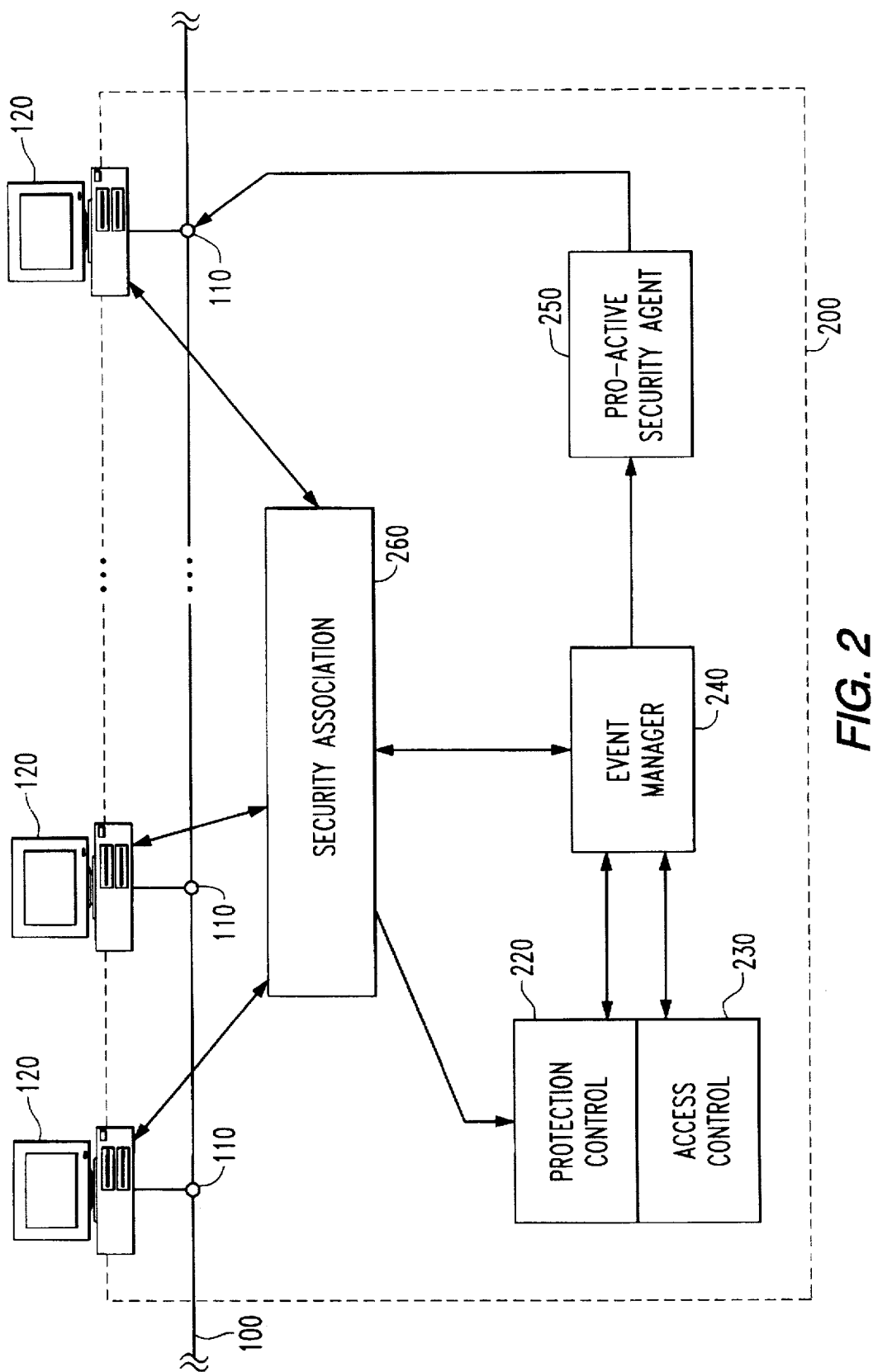
FIG. 2 diagrammatically illustrates a reduced complexity example of an information network interconnecting a plurality of information resource objects, communications among which are controlled by the network resource security services control system of the present invention.

Attention is now directed to FIG. 2, which shows a reduced complexity, non-limiting example of an information resource network 100 having a plurality of resource nodes 110, to which one or more information resource objects, such as respective computers 120 used by user's to couple to and process data transported over the network, may be coupled, and communications among which are supervised or controlled by a network resource security services control system 200. As pointed out briefly above, and as will be detailed infra, network resource security services control system 200 communicates with each of resource and communication control objects, and includes a protection control routine 220, and access control routine 230, and event manager 240 and a pro-active security agent routine 250, which interact with one another and with network resources, so as to control the ability of network users to gain access to, transmit and retrieve information with respect to any of the resources of the network.

The protection control routine 220 comprises cryptography algorithms and authentication mechanisms used by the security services control system 200 when transporting data over the network. Although the cryptography algorithms employed by protection control routine 220 are not limited to any particular type, a particularly suitable scheme is that described in my copending U.S. patent application Ser. No. 08/691,838, filed on Aug. 1, 1996, entitled "Virtual Encryption Scheme Combining Different Encryption Operators into Compound-Encryption Mechanism," assigned to the assignee of the present application and the disclosure of which is incorporated herein.

In accordance with such a 'virtual' encryption scheme, selected ones of plurality of different encryption operators stored in an encryption operator database are combined into a compound sequence of encryption operators. Data to be transported from a data source site, such as a user workstation, to a data recipient site, such as another workstation, is sequentially encrypted by performing a compound sequential data flow through this sequence prior to transmission. Because successively different encryption operators are used, the final output of the sequence will be a compound-encrypted data stream that has no readily discernible encryption footprint. As a consequence, even if a skilled data communications usurper possesses a decryption key for each encryption operators, there is a very low likelihood that he would be able to recognize the characteristics of any individual encryption operator. Moreover, without knowledge of the sequence of encryption operators a potential usurper will be forced to operate under a severe resource penalty that makes decryption of such a compound sequence a practical impossibility. At the recipient end of the data communications path, the recovery process involves the use of a complementary virtual decryption scheme that is the exact reverse of that used at the data source site.

The access control routine 230 is used in conjunction with the protection control routine 220 and includes right to access control factors, such as time of day, length of session, etc., components, with which a user's request for access and continued activity are compared to derive inputs to the event manager.

The event manager 240 is a routine that monitors network activity, in particular 'events' occurring as a result of activity among users and resources of the network. An event is an activity that occurs when a user executes activity in the network, or as a result of exercising or using a resource or object within the system. An object is any potential participant in the system, such as a user, information resource, communication path, protection mechanism (such as a cryptography algorithm or user's authentication procedure within the protection control routine 220), an access control feature of the access control routine 230, etc.

Whenever a user initiates access to the network, multiple objects begin generating events. These events are applied to an events analyzer, which logically combines the event data into an output value. This output value is mapped through one or more rule sets producing network control prompts, which may cause the event manager 240 to take action that will controllably intervene in the current network activity for a user of interest, in response to one or more relationships associated with such activity being satisfied. Such controlled intervention by the event manager includes the ability to affect or modify this security association and thereby a user's ability to gain access to or continue to be granted access to another resource object in the network.

The pro-active security agent routine 250 is a data communications impairment routine, which is operative to conduct one or more data communication interference exercises with respect to a data path or user data resource object of interest. As will be described, this routine is invoked in extreme cases where the event manager has determined that a user's further use of the network would constitute a substantial security threat. As a pro-active data communications mechanism, security routine 250 is effective to partially or totally impair the user's ability to use the network, such that the user will be forced to take action that will be accepted as valid entry to the network.

As noted briefly above, each network resource object 120 has a security association 260 with respect to every other resource object in the network. This security association defines the ability and permission of a respective resource object 120i to communicate with and gain access to another resource object 120j. As a non-limiting example, for a respective user's resource object, such a security association may include one or more of the user's identification codes (including one or more authorization and authentication codes), a list of other objects with whom the object may (and/or may not) communicate, limitations as to time of access (either in general and/or with those other resource objects), what cryptography mechanism that object is allowed to use, what cryptography mechanism that user must use for a given destination resource object, etc.

Thus, as a relatively simple illustration of a security association between two arbitrary resource objects 120i and 120j, each resource object may be a respective computer user who employs a password (access authorization) and a prescribed cryptography algorithm through which communications with each other are to be conducted. As described above, cryptography algorithms and authentication mechanisms are stored within protection control routine 220 used by the security services control system 200 when transporting data over the network. In the present example it may also be understood that each of the resource objects 120i and 120j has a limited time of access to the other object (e.g., between 8:00 A.M. and 5:00 P.M., Monday through Friday). Such authorization criteria are known to authorized users of computers 120i and 120j, and constitute a portion of a network usage rule set, with which such resource objects must comply when using the network.

In addition to such usage rules, the event manager 240 may also have a separate set of policy rules that are not known to the user and serve as an additional layer of access control for enhancing the security of the network. Such policy rules may include a prescribed activity intensity level, which is associated with the number of or total length of time a resource object 120i is using the network to communicate with another resource object 120j. The policy rules may be based upon an a priori activity histogram for other users, with which the user/resource object 120i is expected to conform. As an example, should a resource object 120i spend considerably more time communicating with resource object 120j than established by the histogram, this anomaly would be detected as a violation of policy rules and cause the event manager 240 to execute one or more responses that at least temporarily intrude into the user's network/resource object access session.

Such an event manager-sourced response may include, as a non-limiting example, a query to the user to provide further authentication (which would be associated with a predefined acceptable exception to the histogram norm, allowing the user greater network time than would otherwise be allocated for the destination resource object 120j). This aspect of the present invention contrasts with conventional schemes of simply rejecting (booting-out) a user who has failed an authorization or authentication query. Alternatively, by changing one or more aspects of the security association, the event manager may require the user to employ an increased level of cryptography complexity (associated with a higher network usage level).

As a non-limiting example of relatively severe action that may be taken, the security rule set employed by the event manager 240 for the current data session of interest may classify excessive user activity (in violation of user unknown policy rules) as a substantial network security 'threat'. In response to such a perceived threat, rather than immediately boot-out the user, it may begin to gradually take more drastic action, such as calling up the pro-active security agent routine 250, which then begins to assert prescribed data communication interference signals over the network to the resource object of interest, reconfigure data transport routers, etc., the effect of which is to begin impairing the user's ability to use the network, requiring the user to take action that will be accepted as valid entry to the network. On the other hand if the event manager has classified user activity as a very substantial threat, the pro-active security agent routine may execute major data communication jamming/overload activity with respect to the user, so that the user cannot simply reboot and attempt to circumvent the problem.

Moreover, the security rules themselves, being components or objects of the overall security access control system, may be modified or updated, as required to accommodate event changes, without necessarily terminating access to the network. Thus, in the above example of user activity that might otherwise be initially perceived as exhibiting a substantial network/resource security threat, depending upon the user's interactive response, the policy rules may allow for an adjustment to the threat threshold, before permitting or discontinuing further network access. That fact that each of the security system components is tied together through the events manager substantially facilitates integrating the security services control system into the communication control software of any size or type of data communication network.

As will be appreciated from the foregoing description, the network resource security services control system of the present invention provides an integrated arrangement of security services, that are operative to control the ability of an information storage and retrieval network user to have access to and communicate with one or more information resources within the network. This security access control mechanism includes monitoring activity associated with a user's attempt to and actual conducting of data communications with respect to a system resource, and also the controllable modification of one or more security relationships of a security association that has been established among the users and resources of the system, in dependence upon one or more characteristics of the monitored activity, in such a manner that affects the ability of the system user to conduct data communications with respect to a system resource.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A method of controlling access by a network user to one or more resources of an information network comprising the steps of:

(a) establishing a security association containing one or more security relationships among users and resources of said information network;

(b) selectively permitting a network user to conduct data communications with respect to a network resource in accordance with said security association;

(c) monitoring activity associated with said network user's conducting data communications with respect to said network resource in step (b); and (d) controllably modifying said one or more security relationships contained in the security association that has been established in step (a), in dependence upon one or more characteristics of said activity monitored in step (b), in a manner that affects the ability of said network user to conduct data communications with respect to a network resource.

2. A method according to claim 1, further including the step (e) of, in response to said one or more characteristics of said activity monitored in step (c) satisfying a prescribed relationship with respective to a security control procedure, increasing the difficulty of said network user to conduct further data communications with respect to a network resource.

3. A method according to claim 1, wherein step (d) comprises in response to said one or more characteristics of said activity monitored in step (c) satisfying a prescribed relationship with respective to a security control procedure, modifying said one or more relationships of said security association so as to increase the difficulty of said network user to conduct data communications with respect to a network resource.

4. A method according to claim 1, wherein step (d) comprises in response to said one or more characteristics of said activity monitored in step (c) satisfying a prescribed relationship with respective to a security control procedure, modifying said one or more relationships of said security association so as to require stricter verification of authorization by said user to access said information network in order to continue to conduct data communications with respect to a network resource.

5. A method according to claim 1, wherein step (c) comprises monitoring information generated by a plurality of events associated with said network user's conducting data communications with respect to said network resource in step (b), and wherein step (d) comprises, in response to information generated by said plurality of events satisfying a predetermined relationship with respect to access control criteria governing access to and use of said information network, decreasing the ability of said network user to conduct data communications with respect to a network resource.

6. A method of controlling the ability of a network user to have access to and communicate with one or more information resources of the network by a network user to one or more resources of an information network comprising the steps of:

(a) providing a protection control routine having a plurality of cryptography operators and authentication mechanisms for protecting data transported over said network, an access control routine including control factors associated with a right to access said network, and an event manager which monitors activity among users and resources of the network;

(b) selectively permitting a network user to conduct data communications with respect to a network resource in accordance with a security association containing one or more security relationships among users and resources of said information network; and (c) controllably modifying said one or more security relationships contained in said security association, in dependence upon one or more characteristics of said activity monitored by said event manager, so as to affect the ability of said network user to conduct data communications with respect to a network resource.

7. A method according to claim 6, further comprising the step (d) of selectively invoking a data communications impairment routine which is operative to perform one or more data communication interference exercises with respect to a data path or user data resource of interest, in response to said event manager determining that a user's further use of the network constitutes a security threat.

8. A method according to claim 6, wherein step (c) comprises in response to said one or more characteristics of said activity monitored by said event manager satisfying a prescribed relationship with respective to a security control procedure, modifying said one or more relationships of said security association so as to increase the difficulty of said network user to conduct data communications with respect to a network resource.

* * * * *

UNITED STATES PATENT AND TRADEMARK OFFICE
CERTIFICATE OF CORRECTION

| | | Page 1 of 1 |
|---|---|---|
| PATENT NO. | : 5,787,177 | |
| APPLICATION NO. | : 08/690784 | |
| DATED | : July 28, 1998 | |
| INVENTOR(S) | : Leppek | |

It is certified that error appears in the above-identified patent and that said Letters Patent is hereby corrected as shown below:

Column 7, Line 24    Delete: "step (b)"
                                   Insert: -- step (c) --

Signed and Sealed this

Fourteenth Day of December, 2010

David J. Kappos
*Director of the United States Patent and Trademark Office*